(12) United States Patent
McGinn et al.

(10) Patent No.: US 6,827,040 B1
(45) Date of Patent: Dec. 7, 2004

(54) MODULAR BIRD ACTIVITY CENTER

(76) Inventors: Jerry McGinn, 252 Chaparral Cir., Elgin, IL (US) 60120; Robert Ruderschmidt, 252 Chaparral Cir., Elgin, IL (US) 60120

( * ) Notice: Subject to any disclaimer, the term of this patent is extended or adjusted under 35 U.S.C. 154(b) by 188 days.

(21) Appl. No.: 10/041,903

(22) Filed: Oct. 23, 2001

(51) Int. Cl.[7] .............................................. A01K 15/02
(52) U.S. Cl. ........................ 119/706; 119/537; 119/468
(58) Field of Search ............................ 52/634; 446/227, 446/153; 119/467, 468, 537, 706; 472/116, 117; 482/35, 36; D30/119, 124, 160, 199; D6/512, 549, 552; 211/189, 205

(56) References Cited

U.S. PATENT DOCUMENTS

| | | | | |
|---|---|---|---|---|
| 4,147,344 A | * | 4/1979 | Lee | 482/129 |
| 4,188,745 A | * | 2/1980 | Harvey et al. | 446/227 |
| 4,627,588 A | * | 12/1986 | Block | 248/163.2 |
| 4,718,668 A | * | 1/1988 | Schipske | 473/462 |
| 6,117,054 A | * | 9/2000 | Soltanpour | 482/83 |
| 6,482,066 B1 | * | 11/2002 | Kelly | 446/227 |

* cited by examiner

Primary Examiner—Carl D. Friedman
Assistant Examiner—Chi Q. Nguyen
(74) Attorney, Agent, or Firm—Goldstein Law Offices, P.C.

(57) ABSTRACT

A bird activity center, for providing an instinctually safe playground for a domesticated bird, using a set of a plurality of tubes and T-connectors. The tubes are used to form vertical and horizontal members, which are interconnected using the T-connectors. Toys may be attached directly onto the horizontally members by extending the toy over the horizontal member before attaching into one of the T-connectors. The configuration of the vertical and horizontal members may be customized to meet the available space of the user, and the size of the bird.

4 Claims, 4 Drawing Sheets

MODULAR BIRD ACTIVITY CENTER

BACKGROUND OF THE INVENTION

The invention relates to a modular bird activity center. More particularly, the invention relates to a bird activity center which is-built and customized by the user.

In natural settings, birds spend most of their time perched in trees. The ability to reach high tree branches separates birds from most of their predators. Accordingly, birds instinctually feel the safest when they are perched above the ground.

Although domesticated birds do not face predators as in the wild, they still instinctually feel safest and happiest, when they are perched. Accordingly, bird cages have perches ti give the bird a feeling that it is in a tree.

Many bird owners do not keep their birds in the cage at all times. In fact, many birds are allowed free movement within their owner's home, and return to the cage only at night. However, a bird with free reign can be quite destructive to home furnishings. Accordingly, there is a need for an activity center which maintains the bird's interest, and distracts the bird from any potentially destructive behavior.

Others have proposed bird activity centers, which have fixed configurations. While these units may be suitable for the particular purpose employed, or for general use, they would not be as suitable for the purposes of the present invention as disclosed hereafter.

SUMMARY OF THE INVENTION

It is an object of the invention to produce a bird activity center which provides birds with an instinctually comfortable place to rest and play. Accordingly, the bird activity center provides a plurality of horizontal members upon which a bird can rest, and vertical members which support the horizontal members at a sufficient height above the ground to ensure the comfort of the birds.

It is another object of the invention to provide a bird activity center which may be customized by the user to suit the available space and the size of the bird. Accordingly, the bird activity center is modular, wherein the vertical members and horizontal members are formed by plastic tubes and are interconnected by T-connectors.

It is yet another object of the invention to provide a variety of activities, which are readily accessible to the bird. Accordingly, a variety of toys can be secured onto the horizontal members, and dangle thirteenth. The tubes are extended through a portion of the toy before the tube is either connected between a pair of connectors, or before one of the end caps is placed on the tube.

The invention is a bird activity center, for providing an instinctually safe playground for a domesticated bird, using a set of a plurality of tubes and T-connectors. The tubes are used to form vertical and horizontal members, which are interconnected using the T-connectors. Toys may be attached directly onto the horizontally members by extending the toy over the horizontal member before attaching into one of the T-connectors. The configuration of the vertical and horizontal members may be customized to-meet the available space of the user,.and the size of the bird.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
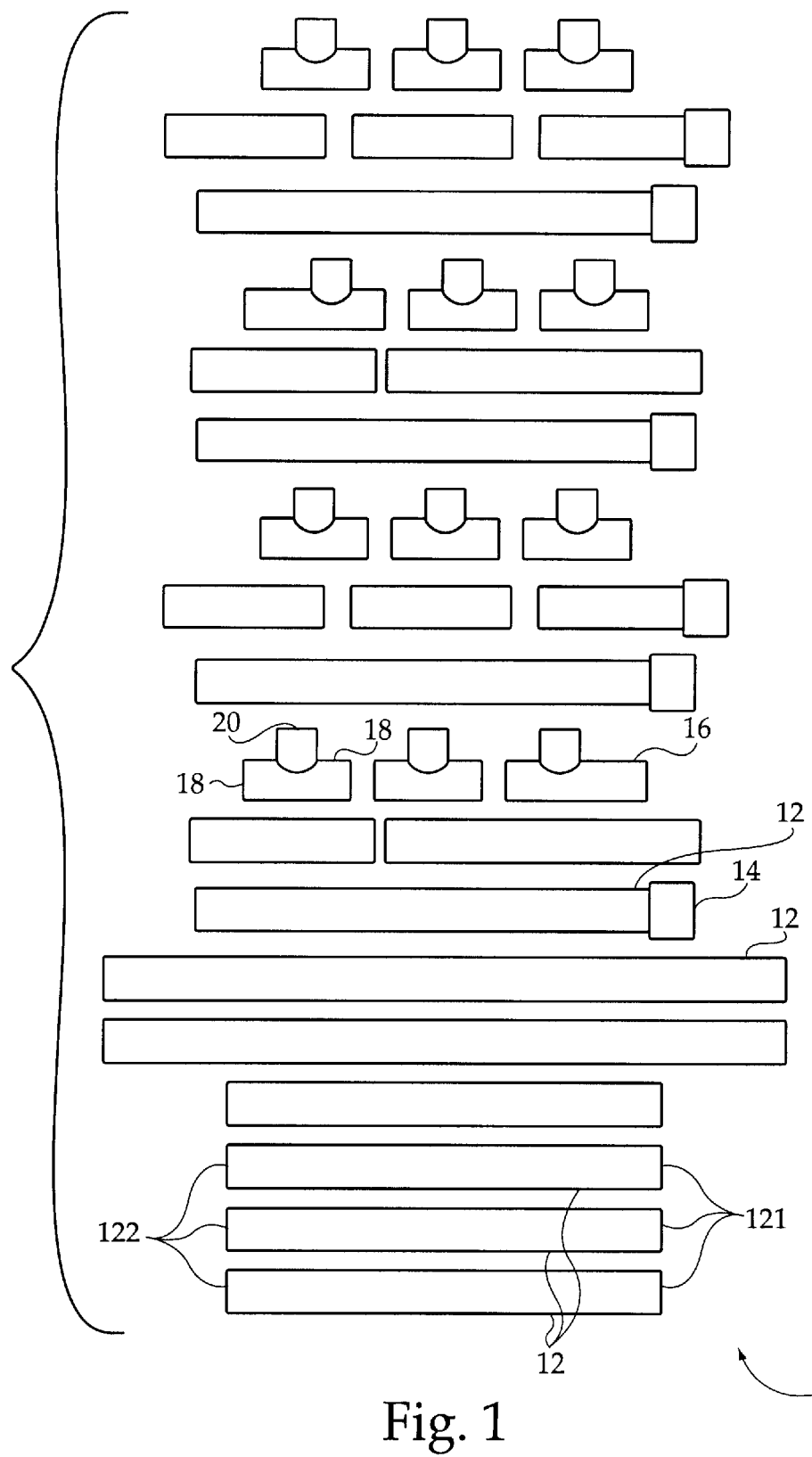
FIG. 1 is a top plan view, illustrating modular components used to construct the bird activity center.

FIG. 1 illustrates a modular bird activity center set 10, comprising a plurality of tubes 12, each tube having a first end 121 and a second end 122. End caps 14 are located on one of the ends of some of the tubes 12, and may be removably mounted thereto. The set 10 also includes a plurality of T-connectors 16, which include two coaxial sockets 18, and one transverse socket 20. A plurality of tubes 12, and T-connectors 16 are provided, to give a user considerable choices in the ultimate configuration of the bird activity center created therewith.

Figure 3:
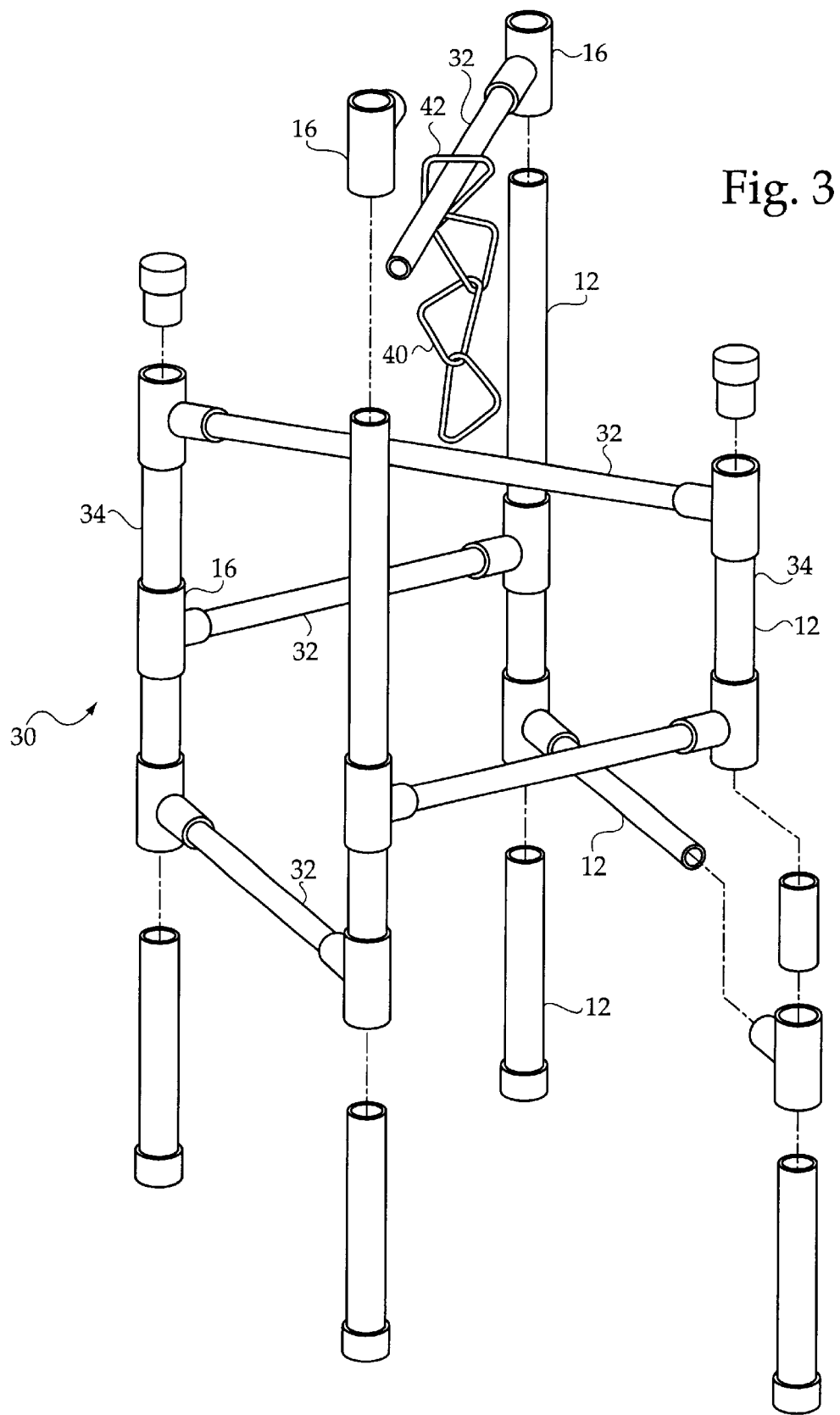
FIG. 3 illustrates how the bird activity center is assembled from its modular components, according to the taste of the user.

FIG. 3 illustrates how the bird activity center 30 is assembled, in particular, that the bird activity center 30 includes both horizontal members 32, and vertical members 34. The tubes 12 are used to form the horizontal and vertical members 32 and 34. The T-connectors 16 are used to interconnect the horizontal and vertical members, to create a complex configuration. In addition, while assembling the bird activity center 30, toys 40 are attached thereon. Generally, each toy 40 has a loop 42 which would typically be used to hang the toy 40 within an ordinary bird cage. However, provided that the loop 42 is at all larger in diameter than the tubes 12, the toy 40 can be hung directly from one of the horizontal members 32. In particular, the tube 12 is inserted through the loop 42 before the tube 12 becomes connected on both ends. Thus, before the tube 12 becomes attached on both ends to one of the T-connectors 16, the loop 42 is inserted so that it becomes trapped between the T-connectors 16.

Figure 2:
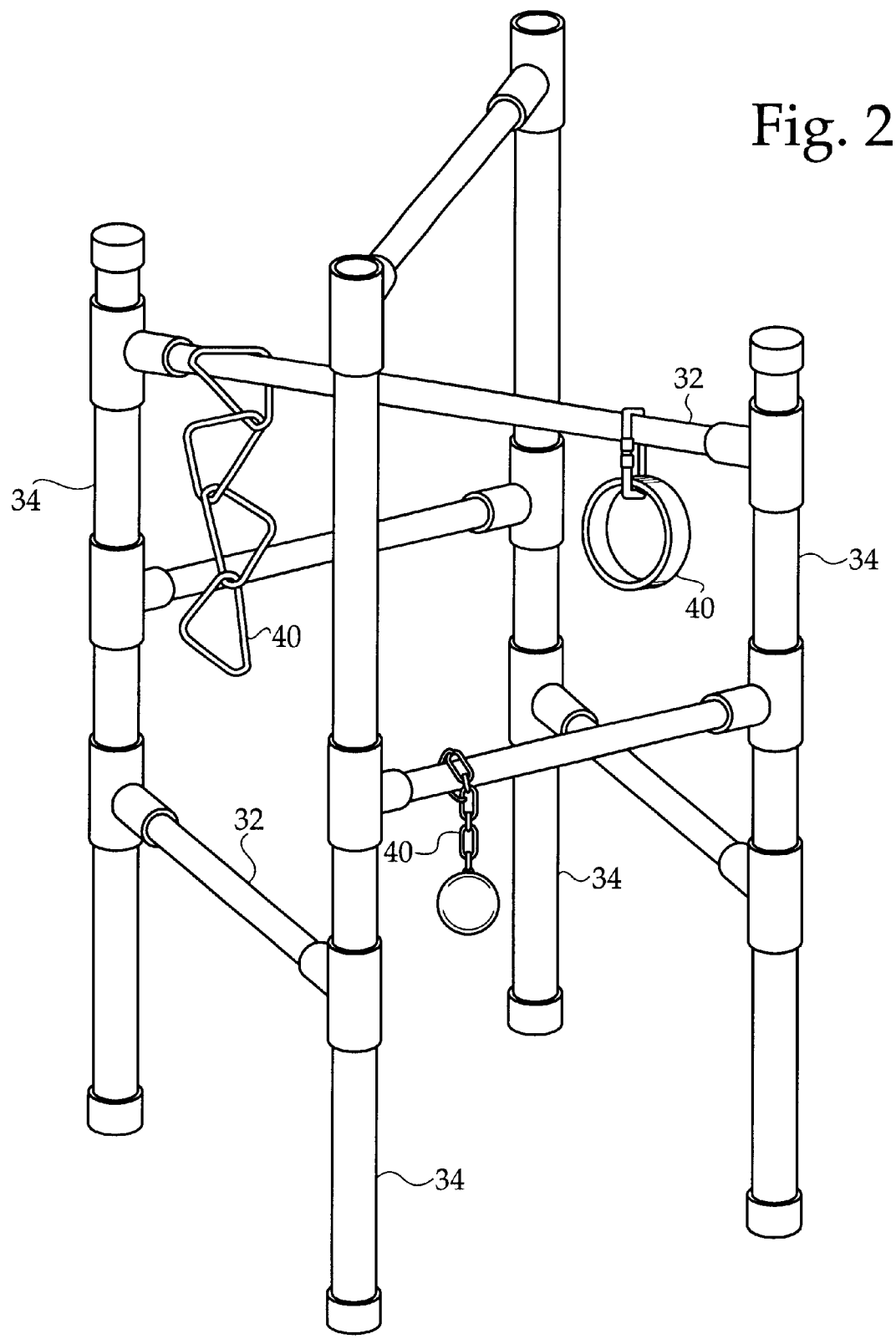
FIG. 2 illustrates the bird activity center fully assembled in a user-selected configuration.

Referring to FIG. 2, the bird activity center 30 has been constructed having numerous vertical members 34 and horizontal members 32. In particular, the use of at least four vertical members 34 allows the bird activity center 30 to be free standing, without the need for a base. In addition, it should be noted that several toys 40 are attached on the various horizontal members 32. Typically, when a toy 40 is placed on a horizontal member 32, it should be placed where it is easily accessible by the bird standing on a slightly lower, nearby horizontal member 32.

Figure 4:
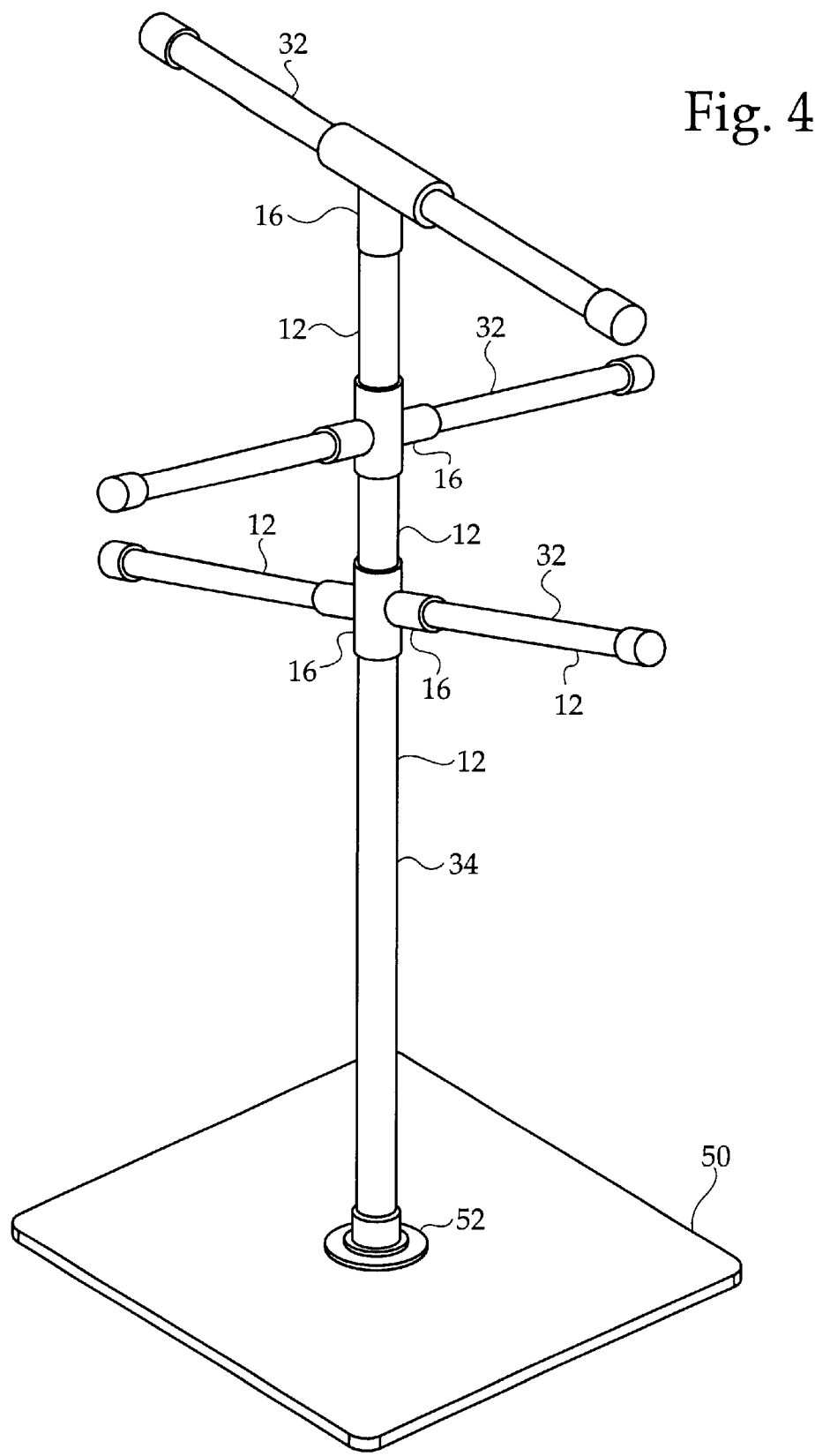
FIG. 4 illustrates an alternate configuration for the bird activity center, using a base and a single vertical member.

FIG. 4 illustrates an alternate configuration, wherein only one vertical member 34 is employed. The vertical member 34 is made up of two or more coaxially aligned tubes 12, connected by T-connectors 16. Note that in this case, the T-connectors 16 are actually cross connectors. The only difference is that it allows a pair of tubes to be coaxially connected to form the vertical member 34, while also allowing a pair of tubes to extend horizontally and coaxially from the vertical member 34. The horizontal members 32 all extend radially from the vertical member 34, and are terminated with the end caps 14. Because of the single vertical member 34, a base 50 is provided. The base 50 is a broad, substantially flat plate. The base 50 has a central socket 52 which accommodates a lowermost of the tubes 12 which makes up the vertical member 34. The base 50 which preferably extends a distance from the central socket 52 which equals or exceeds a maximum distance that the horizontal members 32 extend radially from vertical member 34.

In conclusion, herein is presented a bird activity center which may be custom constructed according to the particular needs of the user through interchangeable tubes and connectors. The invention is illustrated by example in the drawing figures. Numerous variations are possible, while adhering to the inventive concept. Such variations are contemplated as being a part of the present invention.

What is claimed is:

1. A bird activity center for providing an instinctually safe playground for a domesticated bird, comprising:

at least one vertical member, the vertical member including at least one tube;

at least three horizontal members, each horizontal member including at least one tube;

at least one T-connector, each T-connector removably connecting the vertical and horizontal members by selectively connecting the tube of the vertical member and the tubes of two of the horizontal members; and at least one toy having a plurality of loops, wherein one of the tubes of a first horizontal member extends through the loop such that the toy dangles below the first horizontal member and directly spaced above a second horizontal member on which the bird can rest and from which the bird can play with the toy.

2. The bird activity center as recited in claim 1, further comprising a substantially flat base having a central socket, wherein the vertical member is removably connected to the central socket and extends vertically therefrom.

3. The bird activity center as recited in claim 2, wherein the base extends a distance from the central socket which is at least equal to a maximum distance that the horizontal members extend radially from the vertical member.

4. The bird activity center as recited in claim 1, having four vertical members, such that the bird activity center is free standing upon the vertical members.

* * * * *